United States Patent
Liu et al.

(10) Patent No.: US 10,663,081 B2
(45) Date of Patent: May 26, 2020

(54) METHOD AND APPARATUS FOR DETECTING WATER SHORTAGE FOR HUMIDIFIER AND STORAGE MEDIUM

(71) Applicants: Beijing Xiaomi Mobile Software Co., Ltd., Haidian District, Beijing (CN); Beijing Smartmi Technology Co., Ltd., Haidian District, Beijing (CN)

(72) Inventors: Dongxu Liu, Beijing (CN); Xiaoqing Wang, Beijing (CN); Yuya Omoto, Beijing (CN)

(73) Assignees: Beijing Xiaomi Mobile Software Co., Ltd., Beijing (CN); Beijing Smartmi Technology Co., Ltd., Beijing (CN)

( * ) Notice: Subject to any disclaimer, the term of this patent is extended or adjusted under 35 U.S.C. 154(b) by 185 days.

(21) Appl. No.: 15/703,679

(22) Filed: Sep. 13, 2017

(65) Prior Publication Data
US 2018/0073663 A1   Mar. 15, 2018

(30) Foreign Application Priority Data

Sep. 14, 2016   (CN) .......................... 2016 1 0827358

(51) Int. Cl.
| | |
|---|---|
| *F16K 37/00* | (2006.01) |
| *G01F 23/00* | (2006.01) |
| *F24F 11/00* | (2018.01) |
| *G01F 23/16* | (2006.01) |
| *F24F 3/14* | (2006.01) |
| *F16K 33/00* | (2006.01) |

(Continued)

(52) U.S. Cl.
CPC .......... *F16K 37/0041* (2013.01); *F16K 33/00* (2013.01); *F24F 3/14* (2013.01);
(Continued)

(58) Field of Classification Search
CPC ........ F16K 37/0041; F16K 33/00; F24F 3/14; F24F 11/0008; F24F 2006/008;
(Continued)

(56) References Cited

U.S. PATENT DOCUMENTS

| | | | | |
|---|---|---|---|---|
| 4,692,591 | A * | 9/1987 | Cooley | ..................... F22B 1/30 219/483 |
| 6,394,427 | B1 * | 5/2002 | Guetersloh | ............... F24F 6/02 261/106 |
| 2011/0179814 | A1 * | 7/2011 | Fan | ........................ F24F 5/0035 62/121 |

FOREIGN PATENT DOCUMENTS

| | | |
|---|---|---|
| CN | 2171803 Y * | 7/1994 |
| CN | 203757953 U | 8/2014 |

(Continued)

OTHER PUBLICATIONS

EPO translation of CN-2171803-Y (Year: 1994).*

(Continued)

*Primary Examiner* — Stephen Hobson
(74) *Attorney, Agent, or Firm* — Arch & Lake LLP

(57) ABSTRACT

Methods, apparatuses, and storage mediums are provided for detecting water shortage for a humidifier. The method includes: obtaining a water level parameter of a water tank; determining a water level state of the water tank according to the water level parameter. When the water level state of the water tank is a water shortage state, energizing a valve connected to a water box so that water can be added to the water tank through the valve. A number of times of energizing the valve is recorded. When the number of times of energizing the valve exceeds a first preset number of times as well as when the water level state of the water tank determined every time after energization of the valve is the water shortage state, confirming that the water box is short of water.

20 Claims, 12 Drawing Sheets

(51) Int. Cl.
*G01F 23/62* (2006.01)
*G06F 17/00* (2019.01)
*F24F 6/00* (2006.01)

(52) U.S. Cl.
CPC ...... *F24F 11/0008* (2013.01); *G01F 23/0061* (2013.01); *G01F 23/0076* (2013.01); *G01F 23/0092* (2013.01); *G01F 23/16* (2013.01); *G01F 23/62* (2013.01); *F24F 2006/008* (2013.01); *G06F 17/00* (2013.01)

(58) Field of Classification Search
CPC .. F24F 11/64; F24F 11/52; F24F 11/70; F24F 11/62; F24F 11/30; F24F 2110/00; G01F 23/16; G01F 23/006; G01F 23/0092; G01F 23/62; G01F 23/0076; G06F 17/00
See application file for complete search history.

(56) References Cited

FOREIGN PATENT DOCUMENTS

| | | |
|---|---|---|
| CN | 104654498 A | 5/2015 |
| CN | 204757246 U | 11/2015 |
| CN | 105909834 A | 8/2016 |
| CN | 205561129 U | 9/2016 |
| JP | S62218759 A | 9/1987 |
| JP | 2002106921 A | 4/2002 |
| JP | 2012500378 A | 1/2012 |
| JP | 2014163520 A | 9/2014 |
| JP | 2016151359 A | 8/2016 |
| KR | 20120078139 A | 7/2012 |
| KR | 20140056878 A | 5/2014 |
| WO | 2015182738 A1 | 12/2015 |

OTHER PUBLICATIONS

Extended European Search Report Issued in corresponding European Application No. 17191194.4, dated Apr. 16, 2018, 5 pages
First Office Action issued in corresponding Chinese Application No. 201610827358.0, dated Nov. 28, 2018, 6 pages.
Jiang, Pei Rui, et al., "General Speed Train Director", China Railway Publishing House, Sep. 2012, (3p).
Second Office Action issued in Chinese Patent Application No. 201610827358.0 dated Aug. 6, 2019, with English Machine Translation, (24p).

* cited by examiner

METHOD AND APPARATUS FOR DETECTING WATER SHORTAGE FOR HUMIDIFIER AND STORAGE MEDIUM

CROSS-REFERENCE TO RELATED APPLICATION

This application is based on and claims the priority of the Chinese Patent Application No. 201610827358.0, filed on Sep. 14, 2016, which is incorporated herein by reference in its entirety.

TECHNICAL FIELD

The present disclosure is related to the field of home appliances, and more particularly, to a method and apparatus for detecting water shortage for a humidifier, and a storage medium.

BACKGROUND

Currently, air quality is getting more and more attention. Dry air may trigger inflammation in many organs of the body and may cause the skin to produce static electricity. Further, dry air may have adverse effects on respiratory organs. Thus, humidifiers are widely used in offices and homes with dry air. After a user adds water to a water box of one humidifier, the humidifier is turned on so that the humidifier atomizes water in the water box to water mist and spreads the water mist to the air through a pneumatic device. In this way, air humidity is increased, and a good air environment is created.

SUMMARY

Embodiments of the present disclosure provide a method and apparatus for detecting water shortage for a humidifier, and a storage medium. Technical solutions are as follow.

According to a first aspect of the present disclosure, a method for detecting water shortage for a humidifier is provided. The method may include: obtaining a water level parameter of a water tank; determining a water level state of the water tank according to the water level parameter; when the water level state of the water tank is a water shortage state, controlling a valve to be energized, wherein the valve is connected to a water box, the water box is configured to add water to the water tank through the valve, and the valve is opened when the valve is energized; recording a number of times of energizing the valve; when the number of times of energizing the valve exceeds a first preset number of times as well as when the water level state of the water tank determined every time after energization of the valve is the water shortage state, confirming that the water box is short of water.

According to a second aspect of the present disclosure, an apparatus for detecting water shortage for a humidifier is provided. The apparatus may include: a processor, and a memory configured to store instructions executable by the processor. The processor is configured to obtain a water level parameter of a water tank; determine a water level state of the water tank according to the water level parameter; when the water level state of the water tank is a water shortage state, control an valve to be energized, wherein the valve is connected to a water box, the water box is configured to add water to the water tank through the valve, and the valve is opened when the valve is energized; record a number of times of energizing the valve; when the number of times of energizing the valve exceeds a first preset number of times as well as when the water level state of the water tank determined every time after energization of the valve is the water shortage state, confirm that the water box is short of water.

According to a third aspect of the present disclosure, there is provided a non-transitory computer-readable storage medium having stored therein instructions that, when executed by a processor of an apparatus, causes the apparatus to perform a method for detecting water shortage for a humidifier. The method may include: obtaining a water level parameter of a water tank; determining a water level state of the water tank according to the water level parameter; when the water level state of the water tank is a water shortage state, controlling an valve to be energized, wherein the valve is connected to a water box, the water box is configured to add water to the water tank through the valve, and the valve is opened when the valve is energized; recording a number of times of energizing the valve; when the number of times of energizing the valve exceeds a first preset number of times as well as when the water level state of the water tank determined every time after energization of the valve is the water shortage state, confirming that the water box is short of water.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
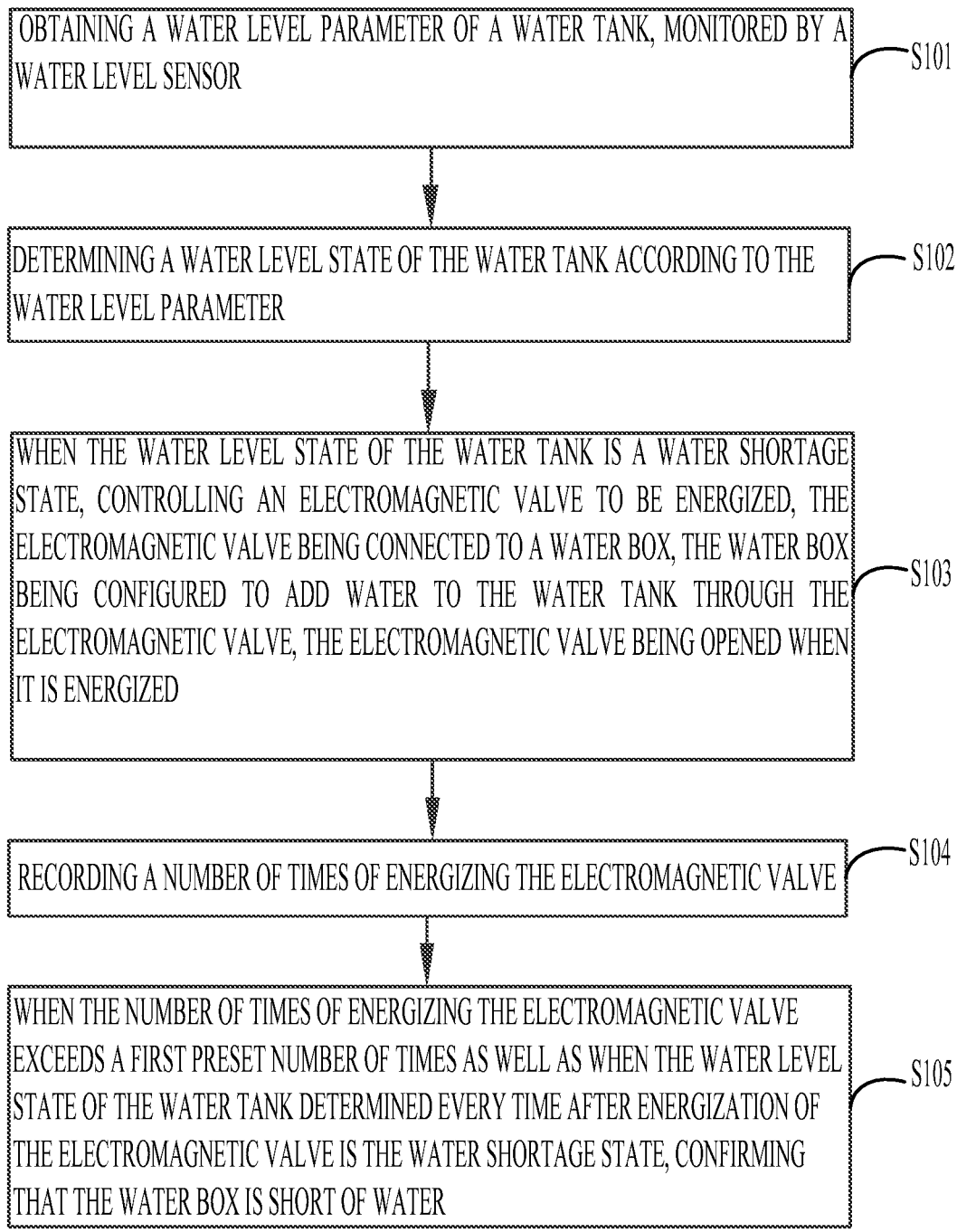
FIG. 1 is a flow chart showing a method for detecting water shortage for a humidifier according to an aspect of the disclosure.

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of apparatuses and methods consistent with aspects related to the disclosure as recited in the appended claims.

Humidifiers are common home appliances in people's lives. Generally, a water box of one humidifier adds water to a water tank of the humidifier according to the principle of connected vessels, in which water is added to the water tank by relying on physical characteristics. However, the connected vessels have a defect that a top cover of the water box cannot be opened. Accordingly, the whole water box needs to be removed to add water to the water tank.

At present, a humidifier with a valve is provided. A water box and a water tank of the humidifier are not connected directly but through the valve. The valve may be an electrical valve such as an electromagnetic valve. When a reed switch detects that a water level in the water tank is low, the electromagnetic valve is controlled to be energized to open the electromagnetic valve, so that water in the water box flows towards the water tank through the opened electromagnetic valve. When detecting that there is water in the water tank, the electromagnetic valve is closed to stop adding water. A top cover of this humidifier can be opened for facilitating a user to add water to the water box, but there is no solution for detecting whether the water box of this humidifier is short of water.

One technical solution provided in the present disclosure includes obtaining a water level parameter of a water tank monitored by a water level sensor, and determining a water level state of the water tank according to the water level parameter; when the water level state of the water tank is a water shortage state, controlling an electromagnetic valve to be energized to open the electromagnetic valve so that a water box can add water to the water tank through the opened electromagnetic valve; then recording a number of times of energizing the electromagnetic valve, and obtaining the number of times of energizing the electromagnetic valve. When the number of times of energizing the electromagnetic valve exceeds a first preset number of times as well as when the water level state of the water tank determined every time after energization of the electromagnetic valve is the water shortage state, it shows that no water or little water is added to water tank, and it also shows that the water box is short of water. At this point, it can be confirmed that the water box is short of water. That is, one or more embodiments can accurately determine whether the water box is short of water.

FIG. 1 is a flow chart showing a method for detecting water shortage for a humidifier according to an exemplary embodiment. As shown in FIG. 1, the method for detecting water shortage may be implemented at least partially in an apparatus for detecting water shortage. The method may include the following steps S101 to S105.

The step S101 is to obtain a water level parameter of a water tank, which may be monitored by a water level sensor.

Here, the water level sensor may be a piezoelectric sensor, which may detect a pressure that indicates a water level of the water tank and convert the pressure to an electrical signal and output it. In this way, the piezoelectric sensor can monitor the water level parameter, i.e., the electrical signal, which indicates the water level of the water tank.

Of course, the water level sensor may also be some other sensor that is capable of detecting the water level parameter that indicates the water level of the water tank. Further, multiple sensors may be used to increase the accuracy of monitoring the water level.

In one or more embodiments, the water level sensor may monitor the water level parameter of the water tank in real time, or may periodically monitor the water level parameter of the water tank. After the water level sensor monitors the water level parameter of the water tank, the apparatus for detecting water shortage obtains the water level parameter of the water tank, monitored by the water level sensor.

The step S102 is to determine a water level state of the water tank according to the water level parameter.

The step S103 is to, when the water level state of the water tank is a water shortage state, control a valve to be energized, where the valve may be an electromagnetic valve. The valve is connected to a water box, and the water box is configured to add water to the water tank through the valve. The valve is opened when it is energized.

After the apparatus for detecting water shortage obtains the water level parameter monitored by the water level sensor, when the water level parameter indicates the water level of the water tank is lower than a certain threshold, the apparatus for detecting water shortage can determine the water level state of the water tank to be the water shortage state according to the water level parameter. For example, when the detected water level parameter indicates that the water level of the water tank is lower than 0.5 cm, it can be determined that the water level state of the water tank is the water shortage state.

In order to prevent false triggering, the apparatus for detecting water shortage may also determine the water level state of the water tank according to multiple successive water level parameters. As an example, when multiple successive water level parameters each indicate the water level of the water tank is a low water level (i.e., indicating that the water level of the water tank is lower than 0.5 cm), it can be determined accurately that the water level of the water tank is indeed the low water level. At this point, the apparatus for detecting water shortage can determine the water level state of the water tank to be the water shortage state, and then it is needed to add water to the water tank. Thus, the apparatus for detecting water shortage controls the electromagnetic valve to be energized one time. The electromagnetic valve is opened when it is energized, so that water in the water box flows to the water tank, thereby enabling addition of water to the water tank.

In order to better control the amount of added water each time the water box adds water to the water tank, the apparatus for detecting water shortage may control the electromagnetic valve to be energized for a predetermined period each time the apparatus for detecting water shortage controls the electromagnetic valve to be energized.

The step S104 is to record a number of times of energizing the valve.

The step S105 is to, when the number of times of energizing the valve exceeds a first preset number of times as well as when the water level state of the water tank determined every time after energization of the valve is the water shortage state, confirm that the water box is short of water.

The apparatus for detecting water shortage may continue performing the step S101 and the step S102 to determine the water level state of the water tank. If the water level state of the water tank determined after one energization of the electromagnetic valve is not the water shortage state, it indicates that water in the water box has flowed to the water tank through the opened electromagnetic valve and water has been added to the water tank.

If the water level state of the water tank determined after one energization of the electromagnetic valve is the water shortage state, it indicates that no water or little water is added to the water tank. At this point, there may be no water in the water box, or there may be water in the water box but little water is added to the water tank within a preset time period. Since the water level state of the water tank is determined as the water shortage state, the apparatus for detecting water shortage controls the electromagnetic valve to be energized again, so as to continue to add water to the water tank.

If there is water in the water box but little water is added to the water tank within the preset time period, then a large amount of water is added to the water tank after the electromagnetic valve is energized several times under control of the apparatus for detecting water shortage to add water to the water tank several times. At this point, the water level state of the water tank determined by the apparatus for detecting water shortage after one certain energization of the electromagnetic valve is not the water shortage state, and the apparatus for detecting water shortage will not open the electromagnetic valve to continue to add water to the water tank, thereby better controlling the amount of added water.

If there is no water in the water box, then the apparatus for detecting water shortage controls the electromagnetic valve to be energized several times. But since there is no water in the water box, the water box cannot add water to the water tank every time the electromagnetic valve is energized. Thus, the water level state of the water tank determined by the apparatus for detecting water shortage after each energization of the electromagnetic valve is the water shortage state.

Thus, the apparatus for detecting water shortage may confirm that the water box is short of water, when the number of times of energizing the electromagnetic valve exceeds the first preset number of times as well as when the water level state of the water tank determined every time after energization of the electromagnetic valve is the water shortage state.

Here, the preset number of times may be determined according to an amount of water flowing from the water box to the water tank through the electromagnetic valve within the preset time period. If the amount of water is large, the preset number of times may be set to be smaller. If the amount of water is small, the preset number of times may be set to be larger.

Here, after the apparatus for detecting water shortage confirms that the water box is short of water, it may output prompt information that the water box is short of water, by sounding a beep alarm, playing a voice prompt saying the water box is short of water, or the like. The prompt information is used to prompt a user to add water to the water box. When the user receives the prompt information, the user can open a top cover of the water box and add water into the water box.

In one or more embodiments, when detecting that the water tank is short of water, the electromagnetic valve is controlled to be energized and the number of times of energizing the electromagnetic valve is recorded. When the number of times of energizing the electromagnetic valve exceeds the first preset number of times as well as when detecting that the water tank is short of water every time after energization of the electromagnetic valve, it can be accurately confirmed that the water box is short of water.

For example, the water level sensor may include an electrical switch and a ring float disposed around the electrical switch. In one or more embodiments, the water level sensor may include a reed switch and a ring float disposed around the reed switch. The float is provided with a magnet therein.

Figure 2:
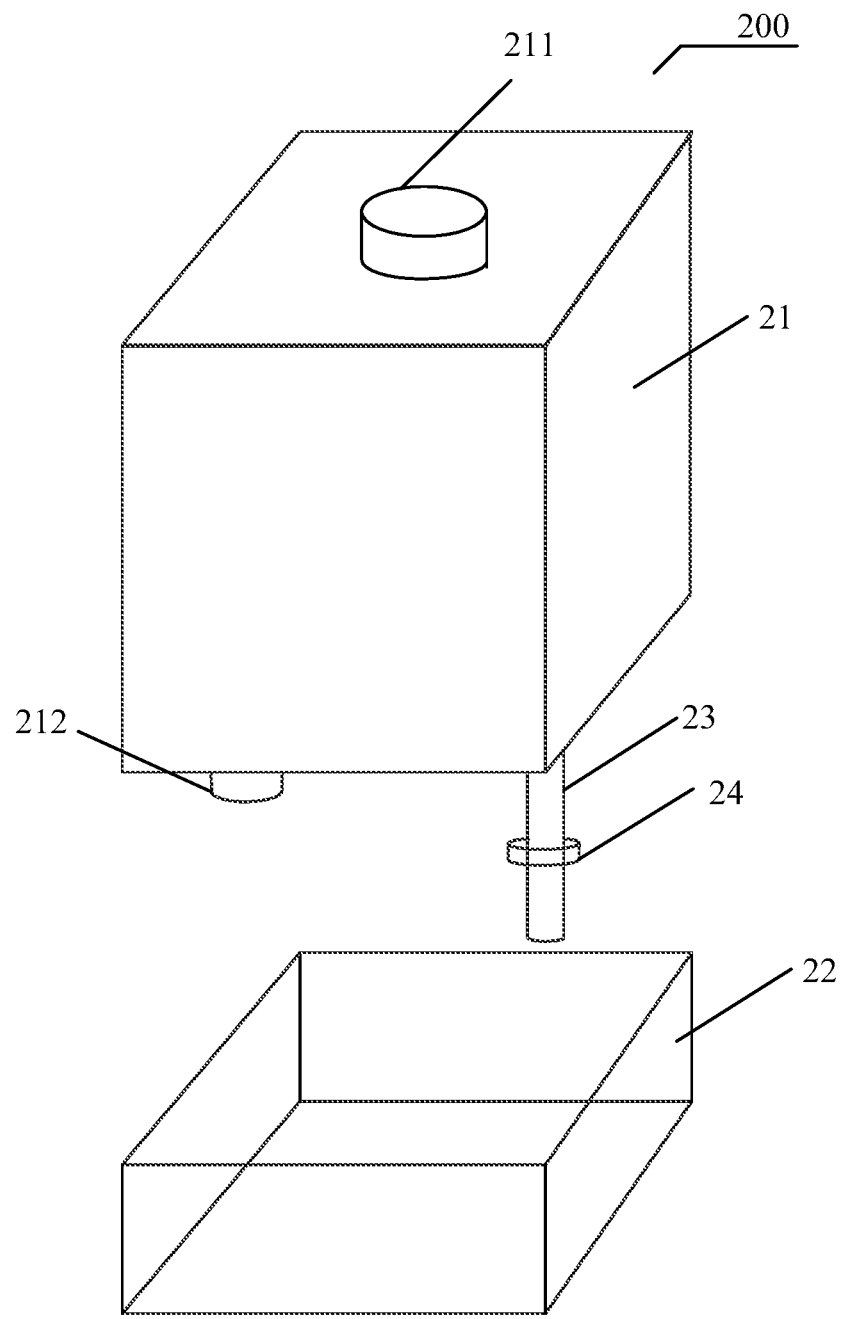
FIG. 2 is a schematic structural view of a humidifier according to an aspect of the disclosure.

FIG. 2 illustrates a humidifier 200 that includes a water box 21 and a water tank 22. The water box 21 and the water tank 22 may be assembled together, and the water box 21 and the water tank 22 shown in FIG. 2 are separated. A top cover 211 is disposed at a top side of the water box 21, which may be opened. An electromagnetic valve 212 is disposed at a bottom side of the water box 21, i.e., one side which is connected with the water tank after being assembled with the water tank. When the electromagnetic valve 212 is opened, water in the water box 21 flows to the water tank 22. Here, the water level sensor may include a reed switch 23 and a ring float 24 disposed around the reed switch 23.

After the water box 21 and the water tank 22 are assembled together, the float 24 floats on water surface in the water tank. A position of the float 24 may indicate the water level of the water tank. The float 24 is provided with a magnet therein. The humidifier outputs a high level signal, when the water tank is short of water, the float 24 disposed around the reed switch 23 sinks, magnetic field generated by the magnet magnetizes reeds of the reed switch 23 and then contact portions of the reeds are attracted together by magnetic force, that is, the reed switch 23 is turned on. The humidifier outputs a low level signal, after water is added to the water tank, the float rises, the magnetic force becomes smaller, and the contact portions of the reeds are separated, that is, the reed switch 23 is turned off. In this way, the water level sensor can accurately monitor the water level parameter of the water tank, i.e., high level signal or low level signal, according to the position of the float.

In one or more embodiments, the water level sensor may include the reed switch and the ring float disposed at least partially around the reed switch, and thus has a simple structure and low cost, and can accurately detect the water level of the water tank.

In one or more embodiments, the step S102 includes steps A1 to A3.

The step A1 is to obtain water level parameters in a detection period.

The step A2 is to, when each of the water level parameters in the detection period is one water level parameter that indicates a low water level, determine that the water level of the water tank as the low water level in the detection period.

The step A3 is to, when each of water levels correspond to a preset number of successive detection periods is the low water level, determine the water level state of the water tank as the water shortage state.

Here, following the above example, the humidifier 200 may be as shown in FIG. 2. The water level sensor may include the reed switch 23 and the ring float 24 disposed around the reed switch 23, and the water level parameter of the water tank monitored by the water level sensor is high level signal or low level signal. The detection period may be set between 1 second to 10 seconds. For example, the detection period may be set to 2 s and the preset number is 2. Then, when each water level parameter of the water tank monitored by the water level sensor and obtained by the apparatus for detecting water shortage within 2 s is high level signal (which indicates that the float has sunk to a low end region of the reed switch), it is determined that the water level of the water tank within 2 s is low water level. When determining that the water level of the water tank within four continuous seconds is always the low water level, the water level state of the water tank is determined as the water shortage state.

Alternatively, in case the water level parameter of the water tank monitored by the water level sensor and obtained by the apparatus for detecting water shortage is an electrical signal that indicates a water level pressure of the water tank, it is determined that the water level of the water tank within 2 s is low water level, when electrical signals detected by the apparatus for detecting water shortage within 2 s indicate that the water level of the water tank is below a preset water level, i.e., the electrical signals indicate low water level. When determining that the water level of the water tank within four continuous seconds is always the low water level, the water level state of the water tank is determined as the water shortage state.

As described above, if the water surface in the water tank is fluctuating all the time which causes the water level sensor to occasionally detect once that the water level of the water tank is the low water level, the apparatus for detecting water shortage will not determine accordingly the water level state of the water tank as the water shortage state, thereby preventing the electromagnetic valve from being energized to add water caused by misjudgment.

According to one or more embodiments, when each of the water levels in a preset number of successive detection periods is the low water level, it can be accurately determined that the water level state of the water tank is the water shortage state, thereby reducing the number of times of mistakenly triggering the electromagnetic valve to add water.

In one or more embodiments, when detecting that the water surface in the water tank is fluctuating, it may be considered that there is water in the water tank and no more water will be added to the water tank. Then, the method further includes step B1.

The step B1 is to, when the water level state of the water tank is determined as a fluctuation state after one energization of the electromagnetic valve, count the number of times of energizing the electromagnetic valve from zero.

Here, when the water level state of the water tank determined by the apparatus for detecting water shortage after one energization of the electromagnetic valve is the fluctuation state, it shows that the water surface in the water tank is fluctuating, which may be caused by an ongoing addition of water in the water box to the water tank or by other reasons such as shaking of the humidifier. This shows that there is water in the water tank and there is no need to add water. Thus, when the apparatus for detecting water shortage determines that the water level state of the water tank is the fluctuation state, the apparatus for detecting water shortage does not control the electromagnetic valve to be energized for a preset period.

If the water level states of the water tank have been determined as the water shortage state several times successively before one energization of the electromagnetic valve while the water level state of the water tank is determined as the fluctuation state after the one energization of the electromagnetic valve, it shows that water is being added from the water box to the water tank, and it also shows that there is water in the water box now. Then, the number of times of energizing the electromagnetic valve may be cleared to and counted from zero.

According to one or more embodiments, when the water level state of the water tank is the fluctuation state, the number of times of energizing the electromagnetic valve may be counted from zero, thereby facilitating determining whether the water box is short of water according to the number of times of energizing the electromagnetic valve.

In one or more embodiments, the apparatus for detecting water shortage may determine the water level state of the water tank as the fluctuation state when the water surface in the water tank fluctuates continuously. Then, the step S102 includes steps C1 and C2.

The step C1 is to obtain water level parameters within the detection period.

The step C2 is to, when the water level parameters within the detection period are constantly changed and a number of changes exceeds a second preset number of times, determine the water level state of the water tank as the fluctuation state.

Here, following the above example, the humidifier 200 may be as shown in FIG. 2. The water level sensor may include the reed switch 23 and the ring float 24 disposed around the reed switch 23, and the water level parameter of the water tank monitored by the water level sensor is high level signal or low level signal. For example, the detection period may be 2 s and the second preset number of times may be 4. Then, when the water level parameters of the water tank monitored by the water level sensor and obtained by the apparatus for detecting water shortage within 2 s are high level signal→low level signal→high level signal→low level signal→high level signal→low level signal→high level signal→low level signal, it shows that the water level parameters within the detection period are constantly changed and the number of changes is 7 which exceeds 4. Accordingly, it is determined that the water level state of the water tank within the 2 s is the fluctuation state.

Alternatively, in case the water level parameter of the water tank monitored by the water level sensor and obtained by the apparatus for detecting water shortage is an electrical signal that indicates a water level pressure of the water tank, when electrical signals detected by the apparatus for detecting water shortage within 2 s indicate that the water level of the water tank is constantly changed between below the preset water level and above the preset water level and the number of changes exceeds 4, then it is determined that the water level of the water tank within the 2 s is fluctuation state.

According to one or more embodiments, when the water level parameters within the detection period are constantly changed and the number of changes exceeds the second preset number of times, it is determined that the water level state of the water tank is the fluctuation state. Such a determining manner is accurate and can prevent misjudgment.

In one or more embodiments, when detecting that there is water in the water tank, no more water will be added to the water tank. Then, the method further includes a step D1.

The step D1 is to, when the water level state of the water tank determined after one energization of the electromagnetic valve is a state of having water, count the number of times of energizing the electromagnetic valve from zero.

Here, when the water level state of the water tank determined by the apparatus for detecting water shortage after one energization of the electromagnetic valve is the state of having water, it shows that water in the water box is added to the water tank when the electromagnetic valve is energized, and it also shows that there is water in the water tank and there is no need to add more water. Thus, when the apparatus for detecting water shortage determines the water level state of the water tank as the state of having water, the apparatus for detecting water shortage does not control the electromagnetic valve to be energized for a preset period.

If the water level states of the water tank have been determined as the water shortage state several times successively before one energization of the electromagnetic valve while the water level state of the water tank is determined as the state of having water after the one energization of the electromagnetic valve, it shows that the water box has added water to the water tank, and it also shows that there is water in the water box at this time. Then, the number of times of energizing the electromagnetic valve may be cleared to and counted from zero.

According to one or more embodiments, when the water level state of the water tank is the state of having water, the number of times of energizing the electromagnetic valve may be counted from zero, thereby facilitating determining whether the water box is short of water according to the number of times of energizing the electromagnetic valve.

In one or more embodiments, the apparatus for detecting water shortage may determine the water level state of the water tank as the state of having water when water is added to the water tank. Then, the step S102 includes steps E1 and E2.

The step E1 is to obtain water level parameters within the detection period.

The step E2 is to, when each of the water level parameters within the detection period is a water level parameter that indicates the high water level, determine the water level state of the water tank as the state of having water.

Here, following the above example, the humidifier 200 may be as shown in FIG. 2. The water level sensor may include the reed switch 23 and the ring float 24 disposed around the reed switch 23, and the water level parameter of the water tank monitored by the water level sensor is high level signal or low level signal. It is assumed that the detection period is 2 s. Then, when each of the water level parameters of the water tank monitored by the water level sensor and obtained by the apparatus for detecting water shortage within 2 s is the low level signal (which indicates that the float has risen to a top end region of the reed switch), it is determined that the water level state of the water tank within the 2 s is the state of having water.

Alternatively, in case the water level parameter of the water tank monitored by the water level sensor and obtained by the apparatus for detecting water shortage is an electrical signal that indicates a water level pressure of the water tank, it is determined that the water level state of the water tank within the 2 s is the state of having water, when electrical signals detected by the apparatus for detecting water shortage within 2 s indicate that the water level of the water tank is above the preset water level, i.e., the electrical signals indicate high water level.

As described above, if the water surface in the water tank is always at the high water level, the apparatus for detecting water shortage determines the water level state of the water tank as the state of having water.

According to one or more embodiments, when each of the water level parameters within the detection period is a water level parameter that indicates the high water level, it is determined that the water level state of the water tank is the state of having water. Such a determining manner is accurate and can prevent misjudgment.

The implementation process is described in details hereinafter with several embodiments.

Figure 3:
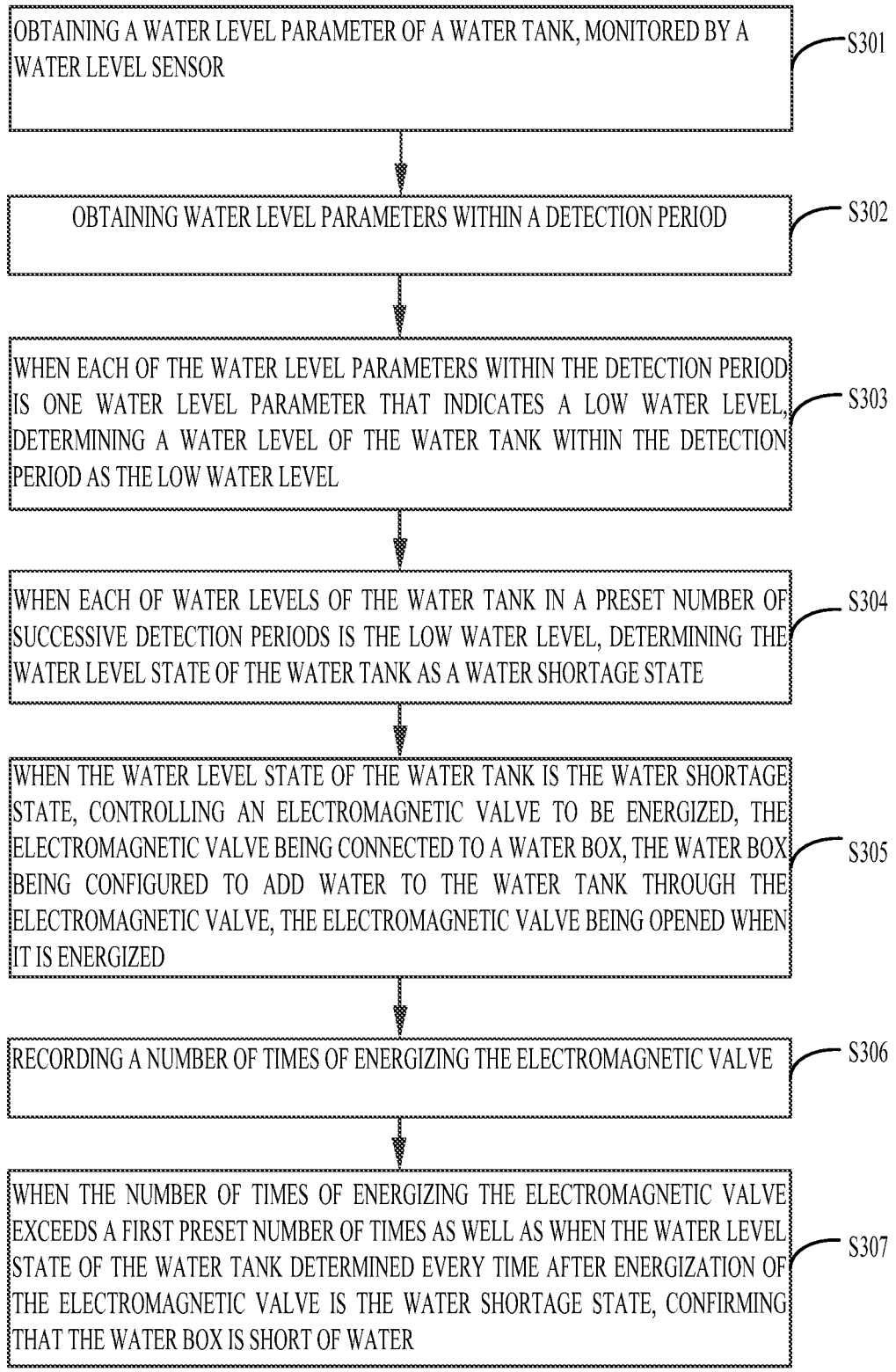
FIG. 3 is a flow chart showing a method for detecting water shortage for a humidifier according to an aspect of the disclosure.

FIG. 3 is a flow chart showing a method for detecting water shortage for a humidifier according to an exemplary embodiment. As shown in FIG. 3, the method may be implemented by the humidifier which includes an apparatus for detecting water shortage, and includes steps S301 to S307.

The step S301 is to obtain a water level parameter of a water tank, monitored by a water level sensor.

The step S302 is to obtain water level parameters within a detection period.

The step S303 is to, when each of the water level parameters within the detection period is one water level parameter that indicates a low water level, determine a water level of the water tank within the detection period as the low water level.

The step S304 is to, when each of water levels of the water tank in a preset number of successive detection periods is the low water level, determine the water level state of the water tank as a water shortage state.

The step S305 is to, when the water level state of the water tank is the water shortage state, control an electromagnetic valve to be energized. The electromagnetic valve is connected to a water box, and the water box is configured to add water to the water tank through the electromagnetic valve. The electromagnetic valve is opened when it is energized.

The step S306 is to record a number of times of energizing the electromagnetic valve.

The step S307 is to, when the number of times of energizing the electromagnetic valve exceeds a first preset number of times as well as when the water level state of the water tank determined every time after energization of the electromagnetic valve is the water shortage state, confirm that the water box is short of water.

Figure 4:
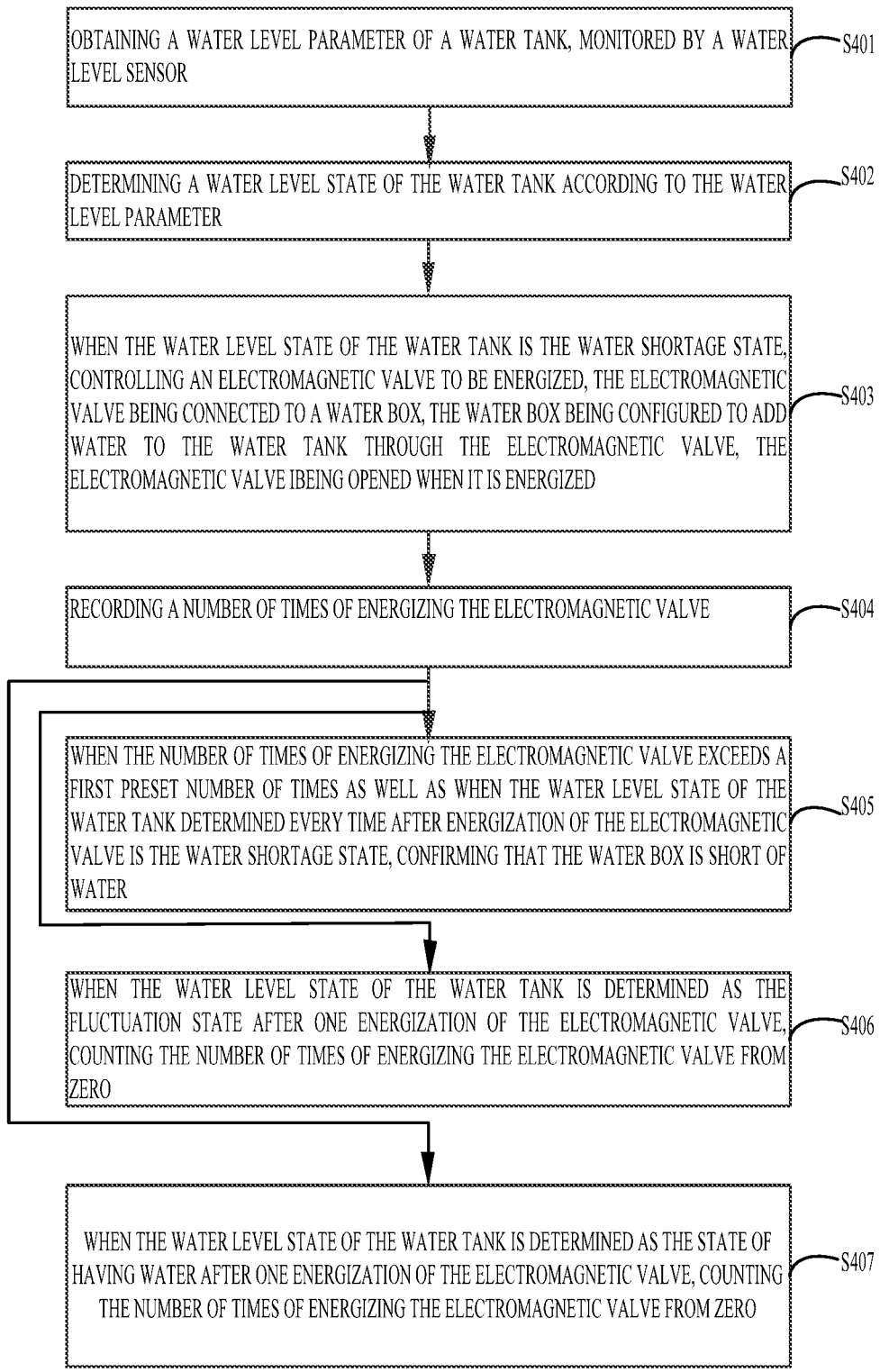
FIG. 4 is a flow chart showing a method for detecting water shortage for a humidifier according to an aspect of the disclosure.

FIG. 4 is a flow chart showing a method for detecting water shortage for a humidifier according to an exemplary embodiment. As shown in FIG. 4, the method may be implemented by the humidifier which includes an apparatus for detecting water shortage, and includes steps S401 to 4307.

The step S401 is to obtain a water level parameter of a water tank, monitored by a water level sensor.

The step S402 is to determine a water level state of the water tank according to the water level parameter.

The determining the water level state of the water tank according to the water level parameter includes: obtaining water level parameters within a detection period, determining a water level of the water tank within the detection period as the low water level when each of the water level parameters within the detection period is one water level parameter that indicates a low water level, and determining the water level state of the water tank as a water shortage state when each of water levels of the water tank in a preset number of successive detection periods is the low water level; obtaining water level parameters within a detection period, and determining the water level state of the water tank as a fluctuation state when the water level parameters within the detection period are constantly changed and a number of changes exceeds a second preset number of times; or obtaining water level parameters within a detection period, and determining the water level state of the water tank as a state of having water when each of the water level parameters within the detection period is one water level parameter that indicates a high water level.

The step S403 is to, when the water level state of the water tank is the water shortage state, control an electromagnetic valve to be energized. The electromagnetic valve is connected to a water box, and the water box is configured to add water to the water tank through the electromagnetic valve. The electromagnetic valve is opened when it is energized.

The step S404 is to record a number of times of energizing the electromagnetic valve.

The step S405 is to, when the number of times of energizing the electromagnetic valve exceeds a first preset number of times as well as when the water level state of the water tank determined every time after energization of the electromagnetic valve is the water shortage state, confirm that the water box is short of water.

The step S406 is to, when the water level state of the water tank is determined as the fluctuation state after one energization of the electromagnetic valve, count the number of times of energizing the electromagnetic valve from zero.

The step S407 is to, when the water level state of the water tank is determined as the state of having water after one energization of the electromagnetic valve, count the number of times of energizing the electromagnetic valve from zero.

Device embodiments of the present disclosure are described hereinafter, and can be used to implement the method embodiments of the present disclosure.

Figure 5:
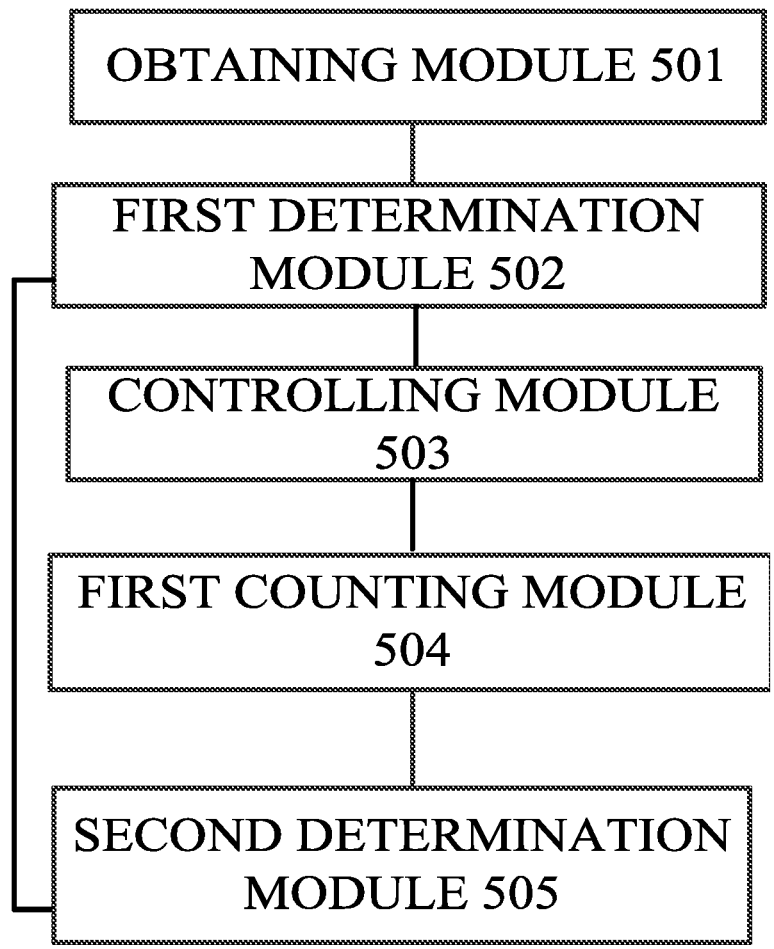
FIG. 5 is a block diagram illustrating an apparatus for detecting water shortage for a humidifier according to an aspect of the disclosure.

FIG. 5 is a block diagram illustrating an apparatus for detecting water shortage for a humidifier according to an exemplary embodiment. The apparatus may be implemented as a part or the entirety of an electronic device by software, hardware or a combination thereof. As shown in FIG. 5, the apparatus for detecting water shortage for the humidifier includes an obtaining module 501, a first determination module 502, a controlling module 503, a first counting module 504 and a second determination module 505.

The obtaining module 501 is configured to obtain a water level parameter of a water tank, monitored by a water level sensor.

The first determination module 502 is configured to determine a water level state of the water tank according to the water level parameter.

The controlling module 503 is configured to, when the water level state of the water tank is a water shortage state, control an electromagnetic valve to be energized. The electromagnetic valve is connected to a water box, and the water box is configured to add water to the water tank through the electromagnetic valve. The electromagnetic valve is opened when it is energized.

The first counting module 504 is configured to record a number of times of energizing the electromagnetic valve.

The second determination module 505 is configured to, when the number of times of energizing the electromagnetic valve exceeds a first preset number of times as well as when the water level state of the water tank determined every time after energization of the electromagnetic valve is the water shortage state, confirm that the water box is short of water.

Figure 6:
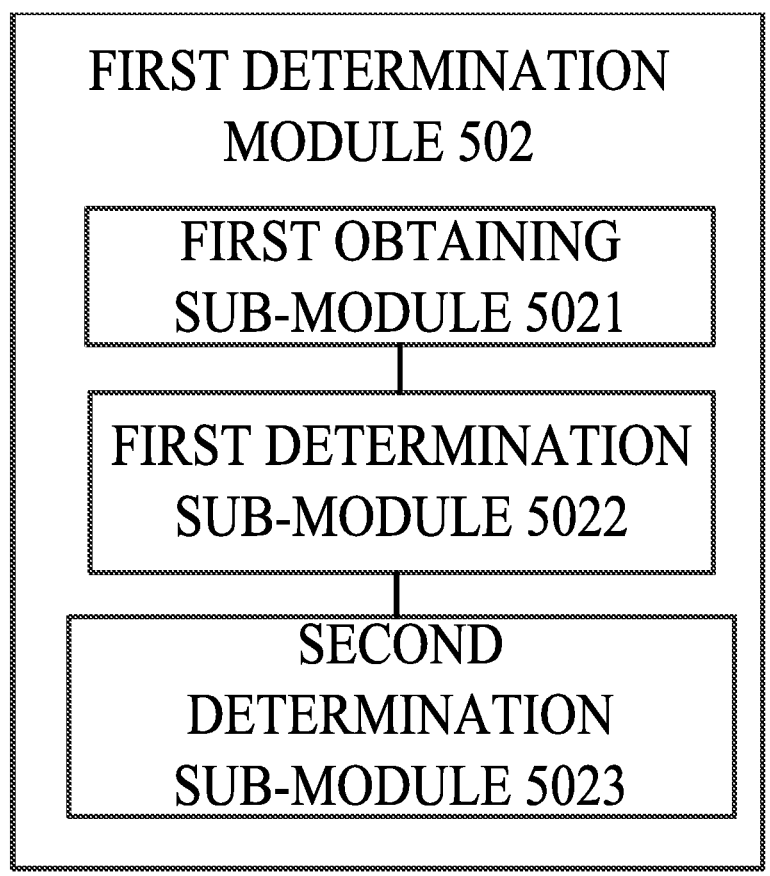
FIG. 6 is a block diagram illustrating a first determination module 502 of an apparatus for detecting water shortage for a humidifier according to an aspect of the disclosure.

In one or more embodiments, as shown in FIG. 6, the first determination module 502 includes a first obtaining sub-module 5021, a first determination sub-module 5022 and a second determination sub-module 5023.

The first obtaining sub-module 5021 is configured to obtain water level parameters within a detection period.

The first determination sub-module 5022 is configured to, when each of the water level parameters within the detection period is one water level parameter that indicates a low water level, determine a water level of the water tank within the detection period as the low water level.

The second determination sub-module 5023 is configured to, when each of water levels of the water tank in a preset number of successive detection periods is the low water level, determine the water level state of the water tank as a water shortage state.

Figure 7:
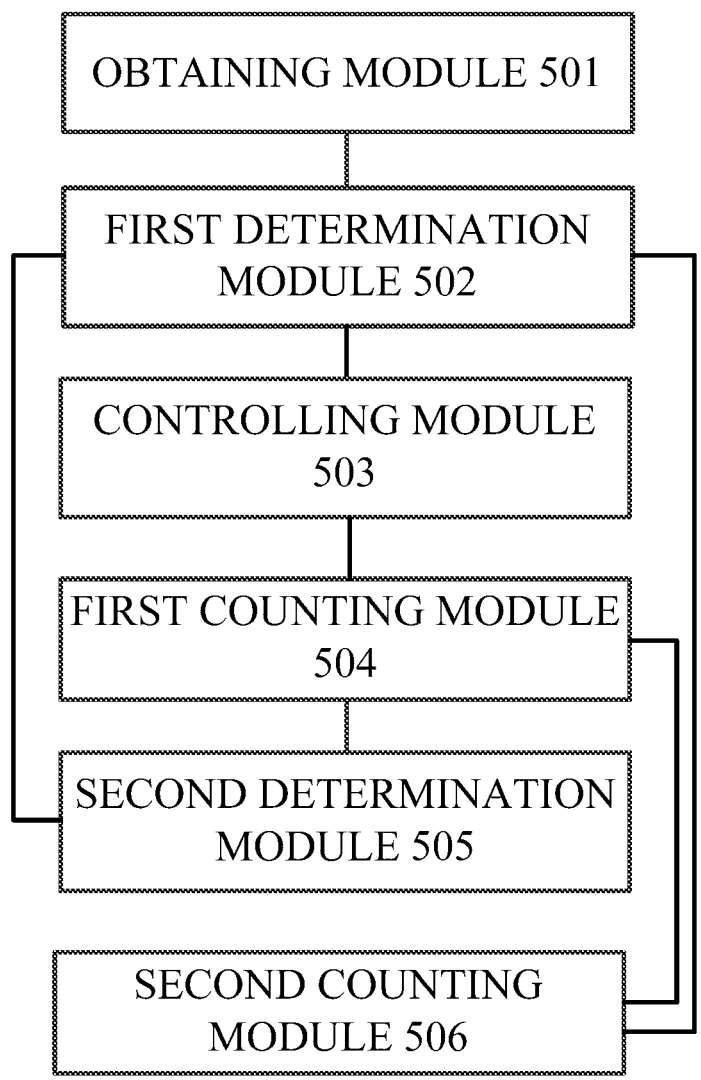
FIG. 7 is a block diagram illustrating an apparatus for detecting water shortage for a humidifier according to an aspect of the disclosure.

In one or more embodiments, as shown in FIG. 7, the apparatus further includes a second counting module 506.

The second counting module 506 is configured to, when the water level state of the water tank is determined as a fluctuation state after one energization of the electromagnetic valve, count the number of times of energizing the electromagnetic valve from zero.

Figure 8:
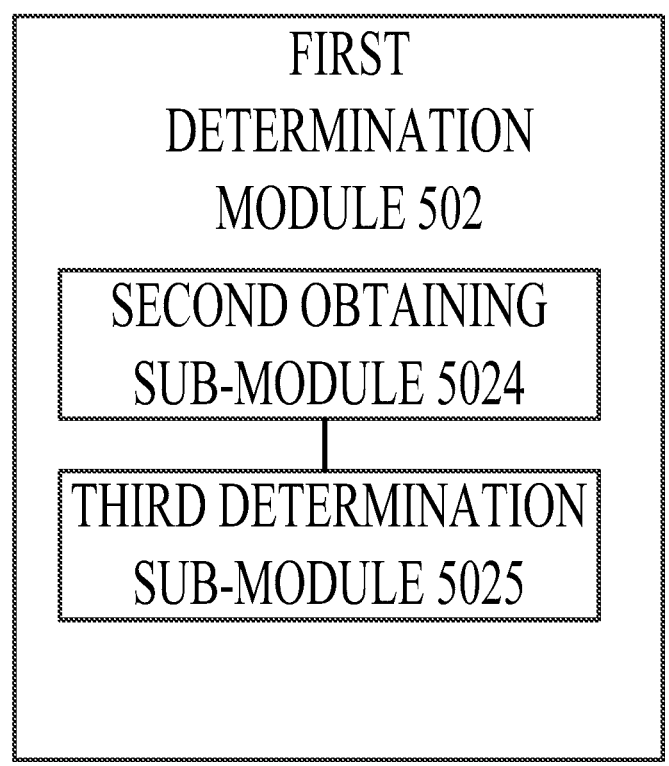
FIG. 8 is a block diagram illustrating a first determination module 502 of an apparatus for detecting water shortage for a humidifier according to an aspect of the disclosure.

In one or more embodiments, as shown in FIG. 8, the first determination module 502 includes a second obtaining sub-module 5024 and a third determination sub-module 5025.

The second obtaining sub-module 5024 is configured to obtain water level parameters within the detection period.

The third determination sub-module 5025 is configured to, when the water level parameters within the detection period are constantly changed and a number of changes exceeds a second preset number of times, determine the water level state of the water tank as the fluctuation state.

Figure 9:
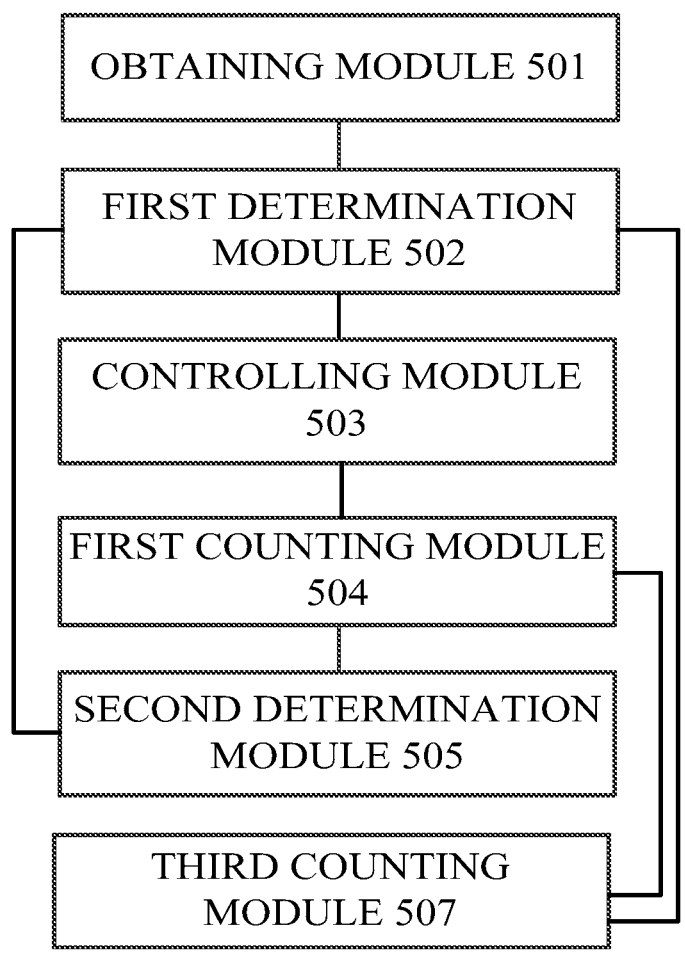
FIG. 9 is a block diagram illustrating an apparatus for detecting water shortage for a humidifier according to an aspect of the disclosure.

In one or more embodiments, as shown in FIG. 9, the apparatus further includes a third counting module 507.

The third counting module 507 is configured to, when the water level state of the water tank determined after one energization of the electromagnetic valve is the state of having water, count the number of times of energizing the electromagnetic valve from zero.

Figure 10:
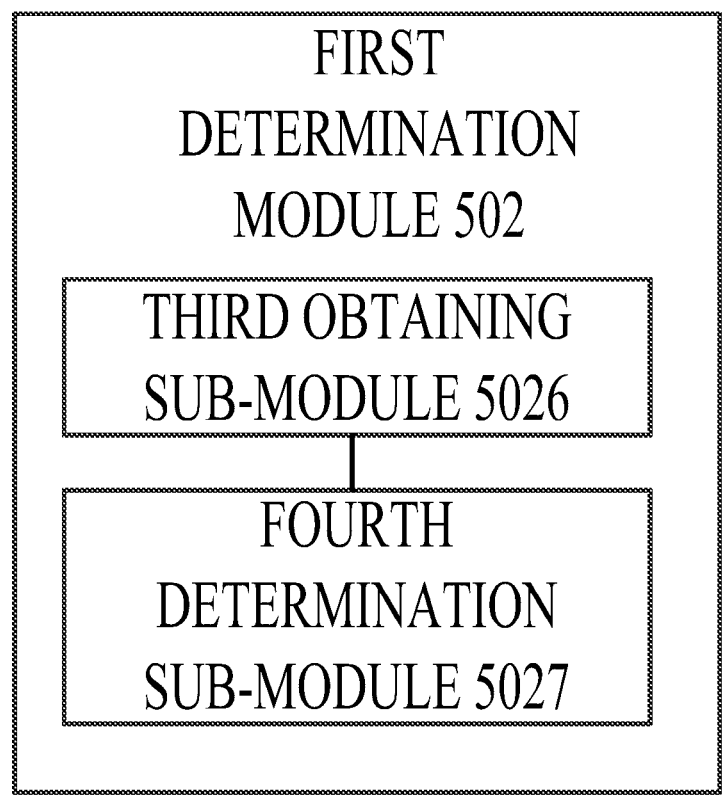
FIG. 10 is a block diagram illustrating a first determination module 502 of an apparatus for detecting water shortage for a humidifier according to an aspect of the disclosure.

In one or more embodiments, as shown in FIG. 10, the first determination module 502 includes a third obtaining sub-module 5026 and a fourth determination sub-module 5027.

The third obtaining sub-module 5026 is configured to obtain water level parameters within the detection period.

The fourth determination sub-module 5027 is configured to, when each of the water level parameters within the detection period is a water level parameter that indicates the high water level, determine the water level state of the water tank as the state of having water.

For example, as shown in FIG. 2, the water level sensor includes a reed switch 23 and a ring float 24 disposed around the reed switch 23. The float 24 is provided a magnet (not shown) therein.

With respect to the apparatus in the above embodiments, the specific manners for performing operations in individual modules therein have been described in detail in the embodiments regarding the related methods and will not be elaborated herein.

Figure 11:
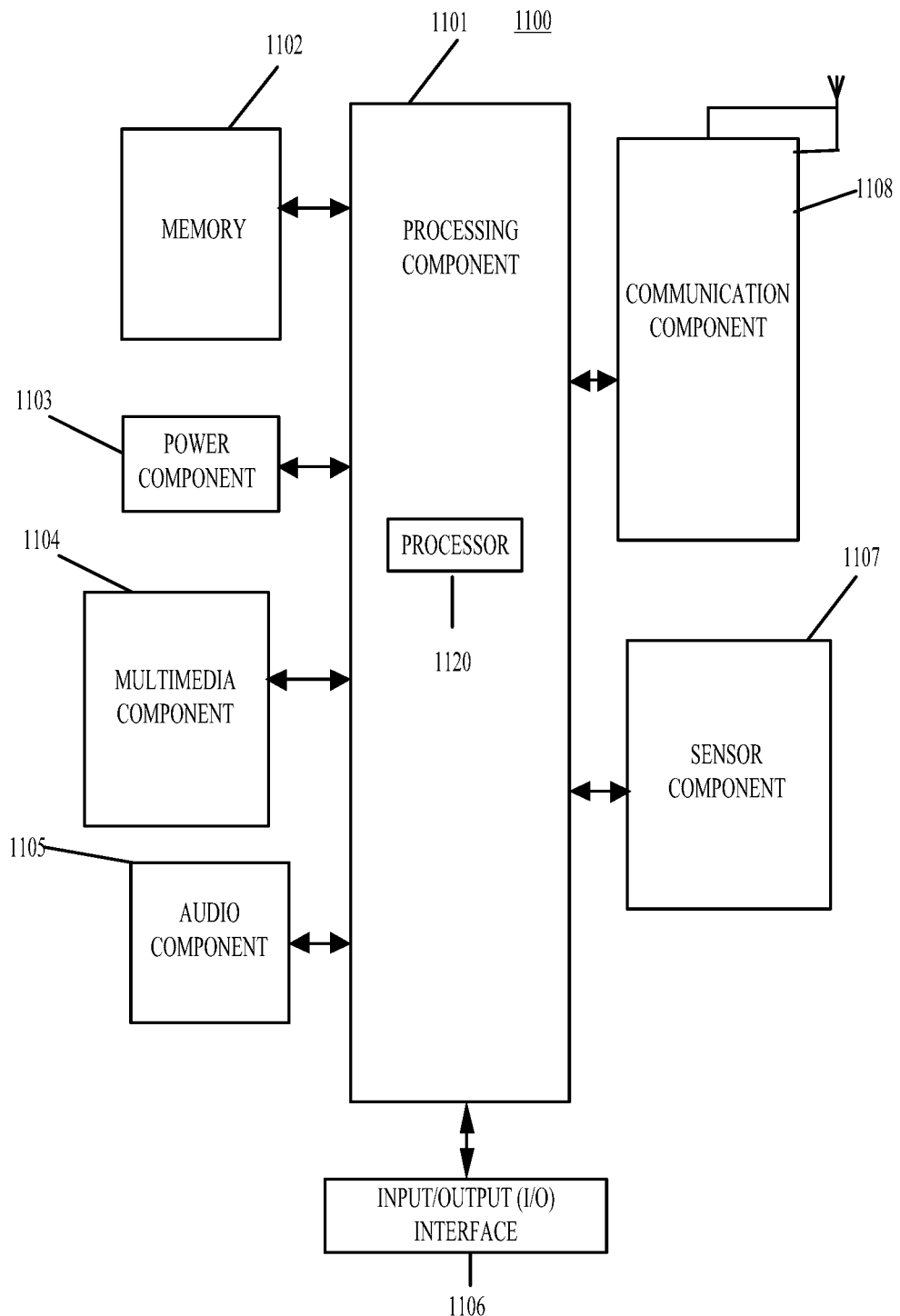
FIG. 11 is a block diagram illustrating an apparatus for detecting water shortage for a humidifier according to an aspect of the disclosure.

FIG. 11 is a block diagram illustrating an apparatus for detecting water shortage for a humidifier according to an exemplary embodiment. The apparatus is applicable to a terminal device. For example, the apparatus 1100 may be a mobile phone, a gaming console, a computer, a tablet device, a personal digital assistant or the like.

The apparatus 1100 may include one or more of the following components: a processing component 1101, a memory 1102, a power component 1103, a multimedia component 1104, an audio component 1105, an input/output (I/O) interface 1106, a sensor component 1107 and a communication component 1108.

The processing component 1101 typically controls overall operations of the apparatus 1100, such as the operations associated with display, phone calls, data communications, camera operations and recording operations. The processing component 1101 may include one or more processors 1120 to execute instructions to perform all or part of the steps in the above described methods. Moreover, the processing component 1101 may include one or more modules which facilitate the interaction between the processing component 1101 and other components. For example, the processing component 1101 may include a multimedia module to facilitate the interaction between the multimedia component 1104 and the processing component 1101.

The memory 1102 is configured to store various types of data to support operations of the apparatus 1100. Examples of such data include instructions for any applications or methods operated on the apparatus 1100, contact data, phonebook data, messages, pictures, video, etc. The memory 1102 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1103 provides power to various components of the apparatus 1100. The power component 1103 may include a power supply management system, one or more power sources, and any other components associated with the generation, management, and distribution of power in the apparatus 1100.

The multimedia component 1104 includes a screen providing an output interface between the apparatus 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 1104 includes a front camera and/or a rear camera. The front camera and/or the rear camera may receive an external multimedia datum while the apparatus 1100 is in an operation mode, such as a photographing mode or a video mode. Each of the front camera and the rear camera may be a fixed optical lens system or have focus and optical zoom capability.

The audio component 1105 is configured to output and/or input audio signals. For example, the audio component 1105 includes a microphone (MIC) configured to receive an external audio signal when the apparatus 1100 is in an operation mode, such as a call mode, a recording mode, and a voice recognition mode. The received audio signal may be further stored in the memory 1102 or transmitted via the communication component 1108. In some embodiments, the audio component 1105 further includes a speaker to output audio signals.

The I/O interface 1106 provides an interface between the processing component 1101 and peripheral interface modules, such as a keyboard, a click wheel, buttons, and the like. The buttons may include, but are not limited to, a home button, a volume button, a starting button, and a locking button.

The sensor component 1107 includes one or more sensors to provide status assessments of various aspects of the apparatus 1100. For instance, the sensor component 1107 may detect an open/closed status of the apparatus 1100, relative positioning of components, e.g., the display and the keypad, of the apparatus 1100, a change in position of the apparatus 1100 or a component of the apparatus 1100, a presence or absence of user's contact with the apparatus 1100, an orientation or an acceleration/deceleration of the apparatus 1100, and a change in temperature of the apparatus 1100. The sensor component 1107 may include a proximity sensor configured to detect the presence of nearby objects without any physical contact. The sensor component 1107 may also include a light sensor, such as a CMOS or CCD image sensor, for use in imaging applications. In some embodiments, the sensor component 1107 may also include an accelerometer sensor, a gyroscope sensor, a magnetic sensor, a pressure sensor or a temperature sensor.

The communication component 1108 is configured to facilitate communication, wired or wirelessly, between the apparatus 1100 and other devices. The apparatus 1100 can access a wireless network based on a communication standard, such as WiFi, 2G; or 3G; or a combination thereof. In one exemplary embodiment, the communication component 1108 receives a broadcast signal or broadcast associated information from an external broadcast management system via a broadcast channel. In one exemplary embodiment, the communication component 1108 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies. In one or more embodiments, one terminal may communicate with the humidifier through the communication component 1108, obtain a water level parameter of a water tank monitored by a water level sensor in the humidifier, and sends a control signal to the humidifier to control an electromagnetic valve to be energized for a predetermined period.

In exemplary embodiments, the apparatus 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an exemplary embodiment, there is also provided a non-transitory computer-readable storage medium including instructions, such as included in the memory 1102, executable by the processor 1120 in the apparatus 1100, for performing the above-described methods. For example, the non-transitory computer-readable storage medium may be a ROM, a RAM, a CD-ROM, a magnetic tape, a floppy disc, an optical data storage device, and the like.

An apparatus for detecting water shortage for a humidifier includes: a processor, a memory configured to store instructions executable by the processor. The processor is configured to obtain a water level parameter of a water tank, which may be monitored by a water level sensor. The processor is further configured to determine a water level state of the water tank according to the water level parameter. When the water level state of the water tank is a water shortage state, the processor may control an electromagnetic valve to be energized, where the electromagnetic valve is connected to a water box. Here, the water box is configured to add water to the water tank through the electromagnetic valve. The electromagnetic valve is opened when the electromagnetic valve is energized. The processor may record a number of times of energizing the electromagnetic valve. When the number of times of energizing the electromagnetic valve exceeds a first preset number of times as well as when the water level state of the water tank determined every time after energization of the electromagnetic valve is the water shortage state, the processor is configured to confirm that the water box is short of water.

The processor is further configured such that determining the water level state of the water tank according to the water level parameter includes: obtaining water level parameters within a detection period; when each of the water level parameters within the detection period is one water level parameter that indicates a low water level, determining a water level of the water tank within the detection period as the low water level; when each of water levels of the water tank in a preset number of successive detection periods is the low water level, determining the water level state of the water tank as the water shortage state.

The processor is further configured such that the method further includes: when the water level state of the water tank determined after one energization of the electromagnetic valve is a fluctuation state, resetting the number of times of energizing the valve to zero. After the resetting, the processor may count the number of times of energizing the valve from zero.

The processor is further configured such that determining the water level state of the water tank according to the water level parameter includes: obtaining water level parameters within a detection period; when the water level parameters within the detection period are constantly changed and a number of changes exceeds a second preset number of times, determining the water level state of the water tank as the fluctuation state.

The processor is further configured such that the method further includes: when the water level state of the water tank determined after one energization of the electromagnetic valve is a state of having water, resetting the number of times of energizing the valve to zero. The processor may be configured to count the number of times of energizing the valve from zero after the resetting.

The processor is further configured such that determining the water level state of the water tank according to the water level parameter includes: obtaining water level parameters within a detection period; when each of the water level parameters within the detection period is one water level parameter that indicates a high water level, determining the water level state of the water tank as the state of having water.

The processor is further configured such that the water level sensor includes a reed switch and a ring float disposed around the reed switch, and the float is provided with a magnet.

A non-transitory computer-readable storage medium stores therein instructions that, when executed by a processor of the apparatus 1100, cause the apparatus 1100 to perform the above method for detecting water shortage for a humidifier. The method includes: obtaining a water level parameter of a water tank, monitored by a water level sensor; determining a water level state of the water tank according to the water level parameter; when the water level state of the water tank is a water shortage state, controlling an electromagnetic valve to be energized, wherein the electromagnetic valve is connected to a water box, the water box is configured to add water to the water tank through the electromagnetic valve, and the electromagnetic valve is opened when the electromagnetic valve is energized; recording a number of times of energizing the electromagnetic valve; when the number of times of energizing the electromagnetic valve exceeds a first preset number of times as well as when the water level state of the water tank determined every time after energization of the electromagnetic valve is the water shortage state, confirming that the water box is short of water.

The instructions stored in the storage medium may be such that determining the water level state of the water tank according to the water level parameter includes: obtaining water level parameters within a detection period; when each of the water level parameters within the detection period is one water level parameter that indicates a low water level, determining a water level of the water tank within the detection period as the low water level; when each of water levels of the water tank in a preset number of successive detection periods is the low water level, determining the water level state of the water tank as the water shortage state.

The instructions stored in the storage medium may be such that the method further includes: when the water level state of the water tank determined after one energization of the electromagnetic valve is a fluctuation state, resetting the number of times of energizing the valve to zero.

The instructions stored in the storage medium may be such that determining the water level state of the water tank according to the water level parameter includes: obtaining water level parameters within a detection period; when the water level parameters within the detection period are constantly changed and a number of changes exceeds a second preset number of times, determining the water level state of the water tank as the fluctuation state.

The instructions stored in the storage medium may be such that the method further includes: when the water level state of the water tank determined after one energization of the electromagnetic valve is a state of having water, resetting the number of times of energizing the valve to zero.

The instructions stored in the storage medium may be such that determining the water level state of the water tank according to the water level parameter includes: obtaining water level parameters within a detection period; when each of the water level parameters within the detection period is one water level parameter that indicates a high water level, determining the water level state of the water tank as the state of having water.

The instructions stored in the storage medium may be such that the water level sensor includes a reed switch and a ring float disposed around the reed switch, and the float is provided with a magnet.

Figure 12:
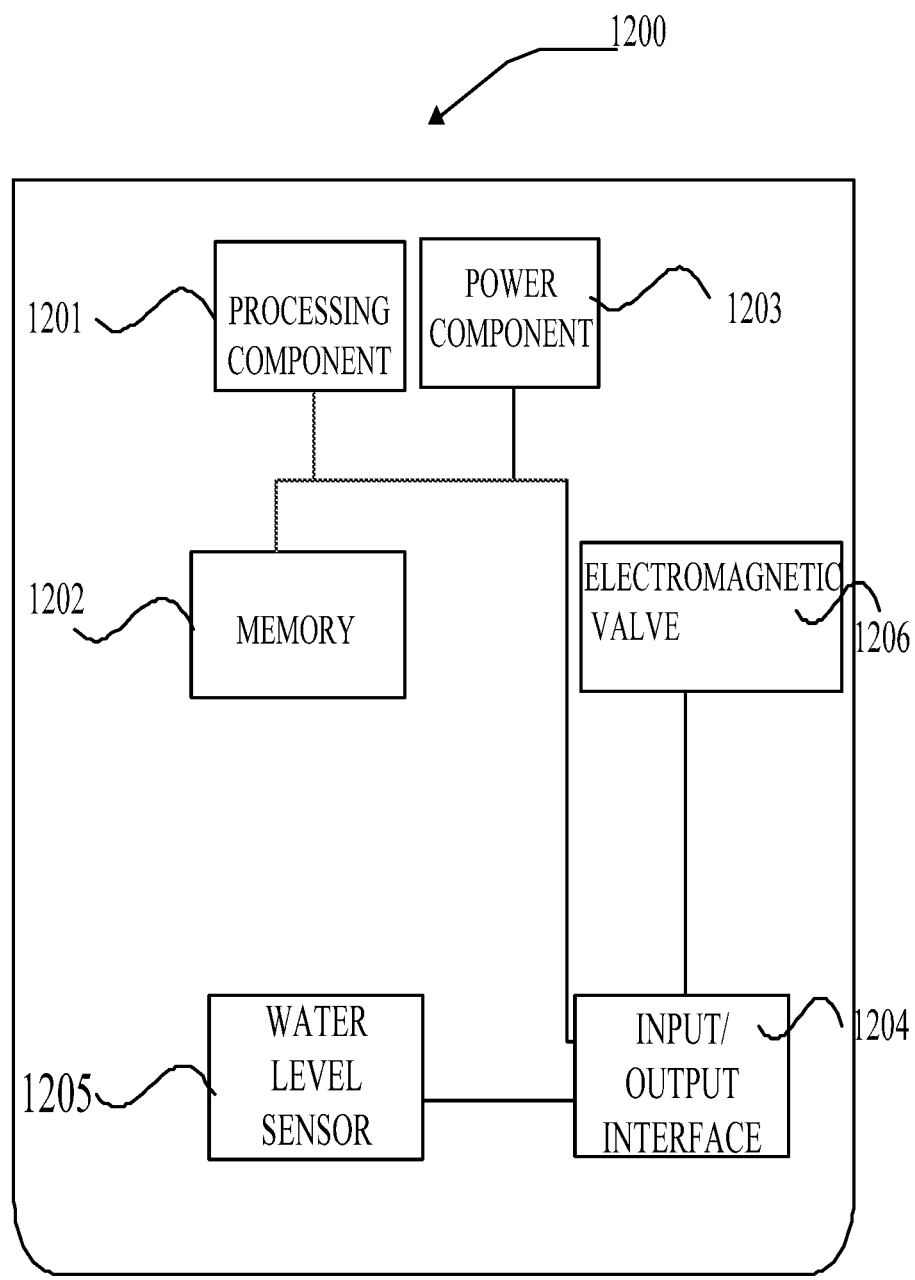
FIG. 12 is a block diagram illustrating an apparatus for detecting water shortage for a humidifier according to an aspect of the disclosure.

FIG. 12 is a block diagram illustrating an apparatus for detecting water shortage 1200 according to an exemplary embodiment. For example, the apparatus 1200 includes a processing component 1201 which further includes one or more processors, and memory resources represented by a memory 1202 for storing instructions executable by the processing component 1201, such as applications. The applications stored in the memory 1202 may include one or more modules, each corresponding to a set of instructions. In addition, the processing component 1201 is configured to execute instructions to perform the above method for detecting water shortage for the humidifier.

The apparatus 1200 may further include a power component 1203 configured to perform power supply management of the apparatus 1200, and an input/output interface 1204 configured to provide an interface between the processing component 1201 and a water level sensor 1205 and to provide an interface between the processing component 1201 and an electromagnetic valve 1206. The apparatus 1200 may operate an operating system stored in the memory 1202, such as Windows Server™, Mac OS X™, Unix™, Linux™, FreeBSD™ or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method, comprising:
   obtaining a water level parameter of a water tank of a humidifier;
   determining a water level state of the water tank according to the water level parameter;
   upon determining that the water level state of the water tank is a water shortage state, energizing a valve connected to a water box so that water can be added to the water tank through the valve;
   recording a number of times of energizing the valve; and
   upon determining that the number of times of energizing the valve exceeds a first preset number of times as well as when the water level state of the water tank determined every time after energizing the valve is the water shortage state, confirming that the water box is short of water.

2. The method of claim 1, wherein determining the water level state of the water tank according to the water level parameter comprises:
   obtaining water level parameters from a water level sensor within a detection period;
   upon determining that each of the water level parameters within the detection period is one water level parameter that indicates a low water level, determining a water level of the water tank within the detection period as the low water level; and
   upon determining that each of water levels of the water tank in a preset number of successive detection periods is the low water level, determining the water level state of the water tank as the water shortage state.

3. The method of claim 1, further comprising:
   upon determining that the water level state of the water tank after one energization of the valve is a fluctuation state, counting the number of times of energizing the valve from zero.

4. The method of claim 3, wherein determining the water level state of the water tank according to the water level parameter comprises:
   obtaining water level parameters within a detection period; and
   upon determining that the water level parameters within the detection period are constantly changing and a number of changes exceeds a second preset number of times, determining the water level state of the water tank as the fluctuation state.

5. The method of claim 1, further comprising:
   upon determining that the water level state of the water tank after one energization of the valve is a state of having water, resetting the number of times of energizing the valve to zero.

6. The method of claim 5, wherein the determining the water level state of the water tank according to the water level parameter comprises:
   obtaining water level parameters within a detection period; and
   upon determining that each of the water level parameters within the detection period is one water level parameter that indicates a high water level, determining the water level state of the water tank as the state of having water.

7. The method of claim 1, further comprising:
   obtaining water level parameters from a water level sensor that comprises a reed switch and a ring float disposed around the reed switch, wherein the ring float is provided with a magnet.

8. An apparatus, comprising:
   a processor; and
   a memory configured to store instructions executable by the processor,
   wherein the processor is configured to
   obtain a water level parameter of a water tank of a humidifier;
   determine a water level state of the water tank according to the water level parameter;
   when the water level state of the water tank is a water shortage state, control a valve to be energized, wherein the valve is connected to a water box, the water box is configured to add water to the water tank through the valve, and the valve is opened when the valve is energized;
   record a number of times of energizing the valve; and
   when the number of times of energizing the valve exceeds a first preset number of times as well as when the water level state of the water tank determined every time after energization of the valve is the water shortage state, confirm that the water box is short of water.

9. The apparatus of claim 8, wherein determining the water level state of the water tank according to the water level parameter comprises:
   obtaining water level parameters monitored by a water level sensor within a detection period;
   when each of the water level parameters within the detection period is one water level parameter that indicates a low water level, determining a water level of the water tank within the detection period as the low water level; and
   when each of water levels of the water tank in a preset number of successive detection periods is the low water level, determining the water level state of the water tank as the water shortage state.

10. The apparatus of claim 8, wherein the processor is further configured to:
    when the water level state of the water tank determined after one energization of the valve is a fluctuation state, count the number of times of energizing the valve from zero.

11. The apparatus of claim 10, wherein determining the water level state of the water tank according to the water level parameter comprises:
    obtaining water level parameters within a detection period; and
    when the water level parameters within the detection period are constantly changed and a number of changes exceeds a second preset number of times, determining the water level state of the water tank as the fluctuation state.

12. The apparatus of claim 8, wherein the processor is further configured to:
when the water level state of the water tank determined after one energization of the valve is a state of having water, resetting the number of times of energizing the valve to zero.

13. The apparatus of claim 12, wherein determining the water level state of the water tank according to the water level parameter comprises:
obtaining water level parameters within a detection period; and
when each of the water level parameters within the detection period is one water level parameter that indicates a high water level, determining the water level state of the water tank as the state of having water.

14. The apparatus of claim 8, further comprising a water level sensor that comprises a reed switch and a ring float disposed at least partially around the reed switch, wherein the float is provided with a magnet.

15. A non-transitory computer-readable storage medium having stored therein instructions that, when executed by a processor of an apparatus, causes the apparatus to perform acts comprising:
obtaining a water level parameter of a water tank;
determining a water level state of the water tank according to the water level parameter;
when the water level state of the water tank is a water shortage state, controlling a valve to be energized, wherein the valve is connected to a water box, the water box is configured to add water to the water tank through the valve, and the valve is opened when the valve is energized; recording a number of times of energizing the valve; and
when the number of times of energizing the valve exceeds a first preset number of times as well as when the water level state of the water tank determined every time after energization of the valve is the water shortage state, confirming that the water box is short of water.

16. The storage medium of claim 15, wherein determining the water level state of the water tank according to the water level parameter comprises:

obtaining water level parameters monitored by a water level sensor within a detection period;
when each of the water level parameters within the detection period is one water level parameter that indicates a low water level, determining a water level of the water tank within the detection period as the low water level; and
when each of water levels of the water tank in a preset number of successive detection periods is the low water level, determining the water level state of the water tank as the water shortage state.

17. The storage medium of claim 15, wherein the acts further comprise:
when the water level state of the water tank determined after one energization of the valve is a fluctuation state, resetting the number of times of energizing the valve to zero.

18. The storage medium of claim 17, wherein determining the water level state of the water tank according to the water level parameter comprises:
obtaining water level parameters within a detection period; and
when the water level parameters within the detection period are constantly changed and a number of changes exceeds a second preset number of times, determining the water level state of the water tank as the fluctuation state.

19. The storage medium of claim 15, wherein the acts further comprise:
when the water level state of the water tank determined after one energization of the valve is a state of having water, resetting the number of times of energizing the valve to zero.

20. The storage medium of claim 19, wherein determining the water level state of the water tank according to the water level parameter comprises:
obtaining water level parameters within a detection period; and
when each of the water level parameters within the detection period is one water level parameter that indicates a high water level, determining the water level state of the water tank as the state of having water.

* * * * *